Feb. 2, 1937.  J. MARS  2,069,586
SECTIONAL INNER TUBE FOR PNEUMATIC TIRES
Filed May 14, 1934
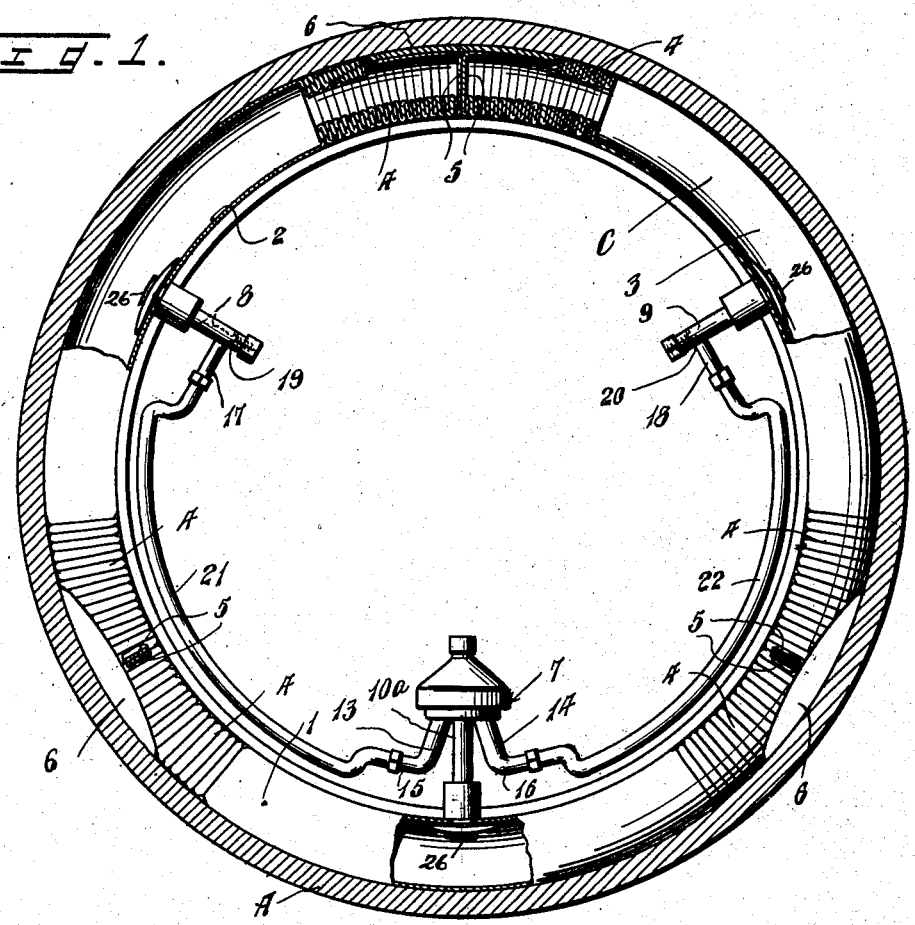
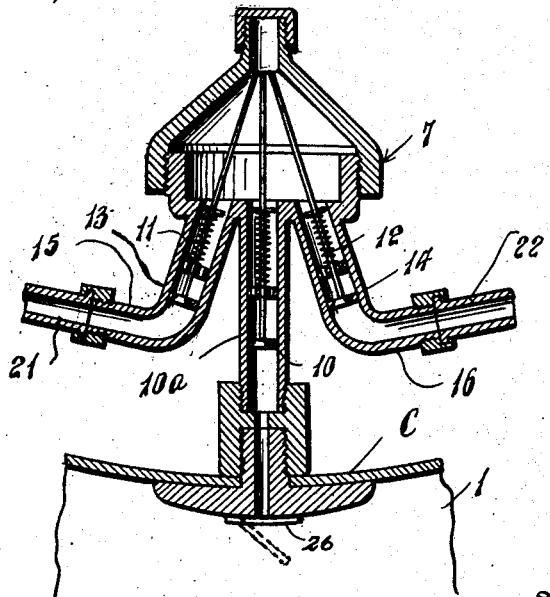
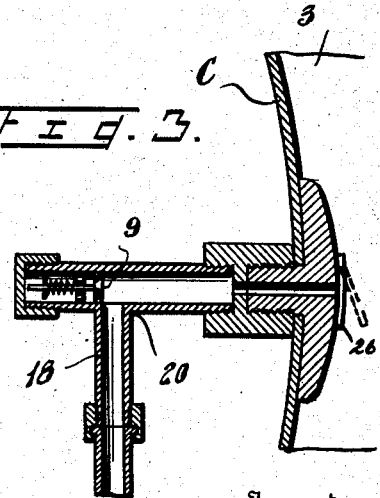
Inventor
J. Mars.

Patented Feb. 2, 1937

2,069,586

UNITED STATES PATENT OFFICE 2,069,586

SECTIONAL INNER TUBE FOR PNEUMATIC TIRES

Joseph Mars, Altamont, Ill.

Application May 14, 1934, Serial No. 725,621

1 Claim. (Cl. 152—22)

This invention relates to new and useful improvements in sectional inner tubes for pneumatic tires.

The primary object of my invention is to provide an inner tube for pneumatic tires that will prevent a "turn over" or accident, in the event of a blow-out when the machine is travelling at a high rate of speed.

I attain this object by making the inner tube in several independent sections which are so constructed and arranged that should one of the sections become punctured, the ends of the remaining sections will immediately telescope or extend into the space formerly occupied by the punctured section and close up the space or gap that would otherwise occur, while still retaining or preserving at least two-thirds of the normal pressure in the tire casing.

With the foregoing and other objects in view that will appear as the nature of my invention is better understood, the same consists in the novel features of construction, combination and arrangement of parts illustrated in the accompanying drawing and more particularly pointed out in the appended claim.

In the accompanying drawing, which is for illustrative purposes only and is therefore not drawn to scale:

Figure 1 is a side elevation, partly in section, illustrating the application of my invention.

Figure 2 is an enlarged detail sectional view of the main valve and Figure 3 is a similar view of one of the secondary valves.

Referring to the drawing for a more particular description of my invention and in which drawing like parts are designated by like reference characters throughout the several views, A designates the tire casing, B the rim and C the sectional inner tube. The tire casing and rim are of any ordinary or approved construction and no further explanation in this connection is therefore considered necessary.

In the preferred embodiment of my invention illustrated in Figure 1 of the drawing, the inner tube C is composed of three corresponding independent sections 1, 2, and 3, respectively, and in carrying out my invention, the combined length or circumference of said sections is somewhat greater than the inner circumference of the tire casing and the inner tube sections are arranged in position in the casing with their ends gathered or folded in continuous layers 4 to take up the slack. To more fully illustrate, if my improved inner tube is used in connection with a 30 inch casing, the respective sections of the inner tube could be approximately 14 inches in length when fully extended and should any of the sections become punctured, the compressed or folded ends of the two remaining sections would immediately telescope or extend into and fill up the resultant gap or space left by the deflated punctured section, while still retaining or preserving at least two-thirds of the pressure in the tire casing. This novel construction of the inner tube fills a long needed want and will prevent "spills" or accidents now frequently resulting from blow-outs, when the machine is travelling at high speed. The ends 5 of the inner tube sections are preferably flat and fit snugly against each other and said sections are joined together by the shoes 6. The shoes 6 are of arcuate or curved form in cross section and preferably made of elongated strips of relatively heavy rubber or similar material, vulcanized to the ends of the tire sections.

My device further comprises a main valve 7 and the secondary valves 8 and 9, used in association with the tire sections 2 and 3, respectively. The main valve 7 may be used to inflate the three tire sections simultaneously, while the secondary valves 8 and 9, may be used to inflate the sections 2 and 3 independently of section 1 and of each other, in case of emergency.

The main valve comprises the central valve 10 and valve stem 10ª, which controls the inflation of the inner tube section 1 and the outer outwardly inclined valves and valve stems 11 and 12, which control the inflation of the inner tube sections 2 and 3 under normal conditions. The valves 11 and 12 work in the tubular housings 13 and 14, connected at their outer right-angularly disposed ends 15 and 16, to the tubular right-angularly disposed extensions 17 and 18 of the sleeves 19 and 20 of the secondary valves 8 and 9, by the rubber tube connections 21 and 22, or other equivalent means.

It will be noted that the valve stems of the valves 10, 11 and 12, are unusually long and that their outer ends converge together at the base of the neck or stem 23 of the bell-shaped cap, screwing on the cylindrical exteriorly threaded body or casing 25 of the main valve.

The main valve 7 and the secondary valves 8 and 9 are provided with suitable flap valves 26 to permit the respective inner tire sections to be partially inflated to a sufficient extent to facilitate insertion in the tire casing A. Said tire sections are subsequently inflated to the required normal pressure in the usual manner, as will be understood.

From the foregoing description taken in connection with the drawing, it is thought that the construction, operation and advantages of my invention will be readily understood without requiring a more extended explanation.

Having described my invention, what I claim as new and desire to secure by Letters Patent, is:

In combination with a tire casing and inner tube composed of a plurality of independent sections, a main valve comprising a cylindrical exteriorly threaded body formed with a central housing and outer outwardly inclined housings, a bell shaped cap screwing on the body of the main valve and formed at its upper end with a reduced neck or stem, valves working in the central and outer outwardly inclined housings of the main valve and formed with relatively long stems converging at the base of the neck or stem of the cap, secondary valves associated with certain of the inner tube sections and formed with right-angularly disposed extensions and flexible tube connections between the outer ends of the outer outwardly inclined housings of the main valve and the extensions of the secondary valves.

JOSEPH MARS.